United States Patent
Shirley et al.

(10) Patent No.: US 12,006,884 B1
(45) Date of Patent: Jun. 11, 2024

(54) SPLIT CYCLE WASTE HEAT METHOD FOR COMBUSTION INITIATION IN GASOLINE COMPRESSION IGNITION ENGINE

(71) Applicants: Hyundai Motor Company, Seoul (KR); Kia Corporation, Seoul (KR)

(72) Inventors: Mark Shirley, Albion, MI (US); Nicholas Fantin, Ann Arbor, MI (US); Shengrong Zhu, Ann Arbor, MI (US); Kyoung Pyo Ha, Gyeonggi-do (KR); Jeffrey Hollowell, Commerce, MI (US); Nahm Roh Joo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/177,527

(22) Filed: Mar. 2, 2023

(51) Int. Cl.
*F02D 41/30* (2006.01)
*F02D 13/02* (2006.01)
*F02D 41/00* (2006.01)
*F02D 41/06* (2006.01)

(52) U.S. Cl.
CPC ....... *F02D 13/0215* (2013.01); *F02D 41/008* (2013.01); *F02D 41/064* (2013.01)

(58) Field of Classification Search
CPC ......... Y02T 10/12; Y02T 10/40; Y02T 10/84; F02D 13/0265; F02D 41/3064; F02D 41/3017; F02D 13/0203; F02D 2200/0414; F02D 41/0087; F02D 13/0207; F02D 13/0215; F02D 13/0219; F02D 41/064; F02D 41/10
See application file for complete search history.

(56) References Cited

U.S. PATENT DOCUMENTS

| 5,230,320 A | * | 7/1993 | Hitomi | F01L 1/26 60/303 |
| 7,219,634 B2 | * | 5/2007 | Hitomi | F02D 41/1475 123/301 |
| 7,810,473 B2 | * | 10/2010 | Ezaki | F02D 41/0005 123/481 |
| 9,611,768 B2 | | 4/2017 | Ha | |
| 9,879,619 B2 | | 1/2018 | Ryu et al. | |
| 10,145,312 B2 | | 12/2018 | Ryu et al. | |

(Continued)

*Primary Examiner* — George C Jin
*Assistant Examiner* — Teuta B Holbrook
(74) *Attorney, Agent, or Firm* — Fox Rothschild LLP (57) ABSTRACT

Systems and methods for having discrete valve opening and closing timings for different pairs of the combustion cylinders, and transitioning an engine from a Low temperature Combustion (LTC) mode to a Gasoline Compression Ignition (GCI) mode are provided. The method may comprise performing a cold start on an engine, comprising at least two sets of cylinders, in a Spark Ignition (SI) mode. The method may comprise, using a discrete camshaft operation for different pairs of the combustion cylinders to run the at least two sets of cylinders in the LTC mode, and when a load operation point of the engine increases, transitioning a first set of cylinders, of the at least two sets of cylinders, to run in a SI mode, and, after the first set of cylinders is transitioned to run in the SI mode, transitioning the second set of cylinders to run in the GCI mode, and, after the second set of cylinders is transitioned to run in the GCI mode, transitioning the first set of cylinders to run in the GCI mode.

12 Claims, 4 Drawing Sheets

(56) References Cited

U.S. PATENT DOCUMENTS

| | | | |
|---|---|---|---|
| 2005/0022755 A1* | 2/2005 | Hitomi | F02D 41/3029 |
| | | | 123/58.8 |
| 2020/0011257 A1* | 1/2020 | Stretch | F02D 17/02 |
| 2020/0182163 A1* | 6/2020 | Fujimoto | F02D 13/0265 |
| 2021/0062709 A1* | 3/2021 | Takayama | F02D 37/02 |
| 2022/0316391 A1* | 10/2022 | Lawler | F02D 41/0025 |
| 2022/0325671 A1* | 10/2022 | Yun | F02D 41/3035 |

* cited by examiner

SPLIT CYCLE WASTE HEAT METHOD FOR COMBUSTION INITIATION IN GASOLINE COMPRESSION IGNITION ENGINE

GOVERNMENT SUPPORT

This invention was made with government support under Award No. DE-EE0008478 awarded by U.S. Department of Energy (DOE). The government has certain rights in the invention.

BACKGROUND

Technical Field

Embodiments of the present disclosure relate to systems and methods for transitioning an engine from a Low temperature Combustion (LTC) mode to a Gasoline Compression Ignition (GCI) mode by utilizing split cycles in different pairs of cylinders.

Background

Multimode Gasoline Compression Ignition (GCI) engines may be configured to operate in multiple operating modes. Combustion modes in GCI engines may be categorized into three operating modes. These include a Spark ignition (SI) mode, a Low temperature Combustion (LTC) mode, and a Gasoline Compression Ignition (GCI) mode.

Typically, the SI mode is used to start the engine and used in very low rpm/low load conditions. In the SI mode, a high geometric compression ratio of the engine may cause knocking conditions as the load increases. As a countermeasure, transition to the LTC mode is utilized to allow increased speed/load operating points beyond spark ignition capability.

The LTC mode is typically used as speed/load operating point increases. The LTC mode is generally characterized by low exhaust temperature/enthalpy. Because of the low temperature of combustion, little enthalpy is contained in the exhaust after expansion work is extracted. As a result, little energy is carried to the turbocharger to provide boost, which is required for GCI combustion.

The GCI mode is typically used at higher load conditions where the LTC mode is not as mechanically acceptable to the engine. The GCI combustion mode generally requires the turbocharger to provide high boost conditions for autoignition to take place. As a result, crossing the LTC to GCI transition is problematic due to not enough exhaust enthalpy to provide the boost needed to initiate GCI combustion.

For multimode GCI engines, variable compressor turbochargers may be used to extend the compressor map to increase available boost levels with reduced exhaust energy input. A variable compressor has a wider flow range and pressure ratio. A variable compressor may be configured to handle wide open throttle (WOT) (e.g., >20 bar brake mean effective pressure (BMEP)) and low flow high pressure ratio points. Lower flow and higher pressure operation is needed in order to support LTC type combustion to GCI type combustion.

Engine testing has shown that even new variable compressor turbochargers are incapable of providing very high boost levels at the low flow rates required for LTC to GCI transitions. Retargeting the turbocharger operation to provide sufficient boost at low exhaust enthalpies typically results in a poor turbocharger match at higher speed/load points.

Multiple turbochargers may also be used with switching valves in order to provide the proper turbo for the operating condition at additional cost. The turbochargers may need to be optimized for each different operating condition individually and a method or system for transitioning from turbocharger during mode switch is required.

SUMMARY

According to an object of the present disclosure, a method for transitioning an engine from a Low temperature Combustion (LTC) mode to a Gasoline Compression Ignition (GCI) mode is provided.

In one aspect, the method may comprise performing a cold start on an engine, wherein the engine comprises at least two sets of cylinders, and performing the cold start comprises running all of the at least two sets of cylinders in a Spark Ignition (SI) mode. The method may comprise, using a discrete camshaft operation for different pairs of the combustion cylinders to run the at least two sets of cylinders in the LTC mode, when a load operation point of the engine increases, transitioning a first set of cylinders, of the at least two sets of cylinders, to run in a SI mode, and, after the first set of cylinders is transitioned to run in the SI mode, transitioning a second set of cylinders, of the at least two sets of cylinders, to run in the GCI mode, and, after the second set of cylinders is transitioned to run in the GCI mode, transitioning the first set of cylinders to run in the GCI mode.

According to an exemplary embodiment, each set of cylinders may comprise a two-cylinder pair of cylinders.

According to an exemplary embodiment, running in the LTC mode may comprise running with no airflow control and running with a negative valve overlap using the CVVD mechanism. When running in the LTC mode, a torque demand may be controlled by fuel.

According to an exemplary embodiment, transitioning the first set of cylinders to run in the GCI mode may be performed when the load operation point increases to approximately 4 bar brake mean effective pressure (BMEP).

According to an exemplary embodiment, the method may further comprise, using the CVVD mechanism, when the at least two sets of cylinders are transitioned to run in the LTC mode, transitioning the first set of cylinders or the second set of cylinders to run in the SI mode for one or more cycles in order to build exhaust energy for turbocharger to generate higher boost for transitioning the at least two sets of cylinders to run in the GCI mode.

According to an exemplary embodiment, the method may further comprise, using the CVVD mechanism, when the at least two sets of cylinders are transitioned to run in the LTC mode, transitioning all of the at least two sets of cylinders to run in the SI mode for one or more cycles in order to build exhaust energy for turbocharger to generate higher boost for transitioning the at least two sets of cylinders to run in the GCI mode.

According to an exemplary embodiment, the first set of cylinders and the second set of cylinders may be configured to be controlled independently from each other.

In a further aspect, methods are provided for having discrete valve opening and closing timings for different pairs of the combustion cylinders, such method comprising: splitting the camshaft operation according to the pair of combustion cylinders, and having a discrete camshaft operation for different pair of combustion cylinders.

According to an object of the present disclosure, a system for transitioning an engine from a LTC mode to a GCI mode is provided. The system may comprise an engine comprising at least two sets of cylinders, wherein the engine is configured to perform a cold start on an engine, comprising running all of the at least two sets of cylinders in a SI mode. The engine may comprise a CVVD mechanism configured to run the at least two sets of cylinders in an LTC mode, when a load operation point of the engine increases, transition a first set of cylinders, of the at least two sets of cylinders, to run in a SI mode, and, after the first set of cylinders is transitioned to run in the SI mode, transition a second set of cylinders, of the at least two sets of cylinders, to run in the GCI mode, and, after the second set of cylinders is transitioned to run in the GCI mode, transition the first set of cylinders to run in the GCI mode.

According to an exemplary embodiment, each set of cylinders may comprise a two-cylinder pair of cylinders.

According to an exemplary embodiment, running in the LTC mode may comprise running with no airflow control and running with a negative valve overlap using the CVVD mechanism. When running in the LTC mode, the torque demand may be controlled by fuel.

According to an exemplary embodiment, the CVVD mechanism may be configured to transition the first set of cylinders to run in the GCI mode when the load operation point increases to approximately 4 bar BMEP.

According to an exemplary embodiment, the CVVD mechanism may be configured to, when the at least two sets of cylinders are transitioned to run in the LTC mode, transition the first set of cylinders or the second set of cylinders to run in the SI mode for one or more cycles in order to build exhaust energy to supply power for transitioning the at least two sets of cylinders to run in the GCI mode.

According to an exemplary embodiment, the CVVD mechanism may be configured to, when the at least two sets of cylinders are transitioned to run in the LTC mode, transition all of the at least two sets of cylinders to run in the SI mode for one or more cycles in order to build exhaust energy to supply power for transitioning the at least two sets of cylinders to run in the GCI mode.

According to an exemplary embodiment, the first set of cylinders and the second set of cylinders are configured to be controlled independently from each other.

According to an object of the present disclosure, a system for transitioning an engine from a LTC mode to a GCI mode is provided. The system may comprise an engine comprising at least two sets of cylinders, a pair of dual-CVVD mechanisms, and a computing device, comprising a processor and a memory. The computing device may be configured to store programming instructions that, when executed by the processor, cause the processor to perform a cold start on an engine, comprising running all of the at least two sets of cylinders in a SI mode, and, using the CVVD mechanism to run the at least two sets of cylinders in a LTC mode, when a load operation point of the engine increases, transition a first set of cylinders, of the at least two sets of cylinders, to run in a SI mode, and, after the first set of cylinders is transitioned to run in the SI mode, transition a second set of cylinders, of the at least two sets of cylinders, to run in the GCI mode, and, after the second set of cylinders is transitioned to run in the GCI mode, transition the first set of cylinders to run in the GCI mode.

According to an exemplary embodiment, each set of cylinders may comprise a two-cylinder pair of cylinders.

According to an exemplary embodiment, running in the LTC mode may comprise running with no airflow control and running with a negative valve overlap using the CVVD mechanism. When running in the LTC mode, the torque demand may be controlled by fuel.

According to an exemplary embodiment, the programming instructions, when executed by the processor, may cause the processor to, using the CVVD mechanism, transition the first set of cylinders to run in the GCI mode when the load operation point increases to approximately 4 bar BMEP.

According to an exemplary embodiment, the programming instructions, when executed by the processor, may cause the processor to, using the CVVD mechanism, when the at least two sets of cylinders are transitioned to run in the LTC mode, transition the first set of cylinders or the second set of cylinders to run in the SI mode for one or more cycles in order to build exhaust energy to supply power for transitioning the at least two sets of cylinders to run in the GCI mode.

According to an exemplary embodiment, the programming instructions, when executed by the processor, may cause the processor to, using the CVVD mechanism, when the at least two sets of cylinders are transitioned to run in the LTC mode, transition all of the at least two sets of cylinders to run in the SI mode for one or more cycles in order to build exhaust energy to supply power for transitioning the at least two sets of cylinders to run in the GCI mode.

In a further aspect, a system for transitioning an engine from a Low temperature Combustion (LTC) mode to a Gasoline Compression Ignition (GCI) mode is provided, the system, comprising: a) an engine comprising at least two sets of cylinders; b) a discrete camshaft operation for different pair of combustion cylinders; and c) a computing device, comprising a processor and a memory, configured to store programming instructions that, when executed by the processor, cause the processor to: (i) perform a cold start on an engine, comprising running all of the at least two sets of cylinders in a Spark Ignition (SI) mode; and (ii) using the discrete camshaft operation for different pair of combustion cylinders to run all of the at least two sets of cylinders in a LTC mode: when a load operation point of the engine increases: transition a first set of cylinders, of the at least two sets of cylinders, to run in a SI mode; and after the first set of cylinders is transitioned to run in the SI mode, transition a second set of cylinders, of the at least two sets of cylinders, to run in the GCI mode; and after the second set of cylinders is transitioned to run in the GCI mode: transition the first set of cylinders to run in a GCI mode.

In certain aspects of such a system, each set of cylinders comprises a two-cylinder pair of cylinders; and wherein running in the LTC mode comprises: running with no airflow control; and running with a negative valve overlap using a discrete camshaft operation for different pair of combustion cylinders, wherein, the exhaust valve closing timing is earlier than the intake valve opening timing.

In further aspects, vehicles are provided that comprise a method or system as disclosed herein.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Figure 1:
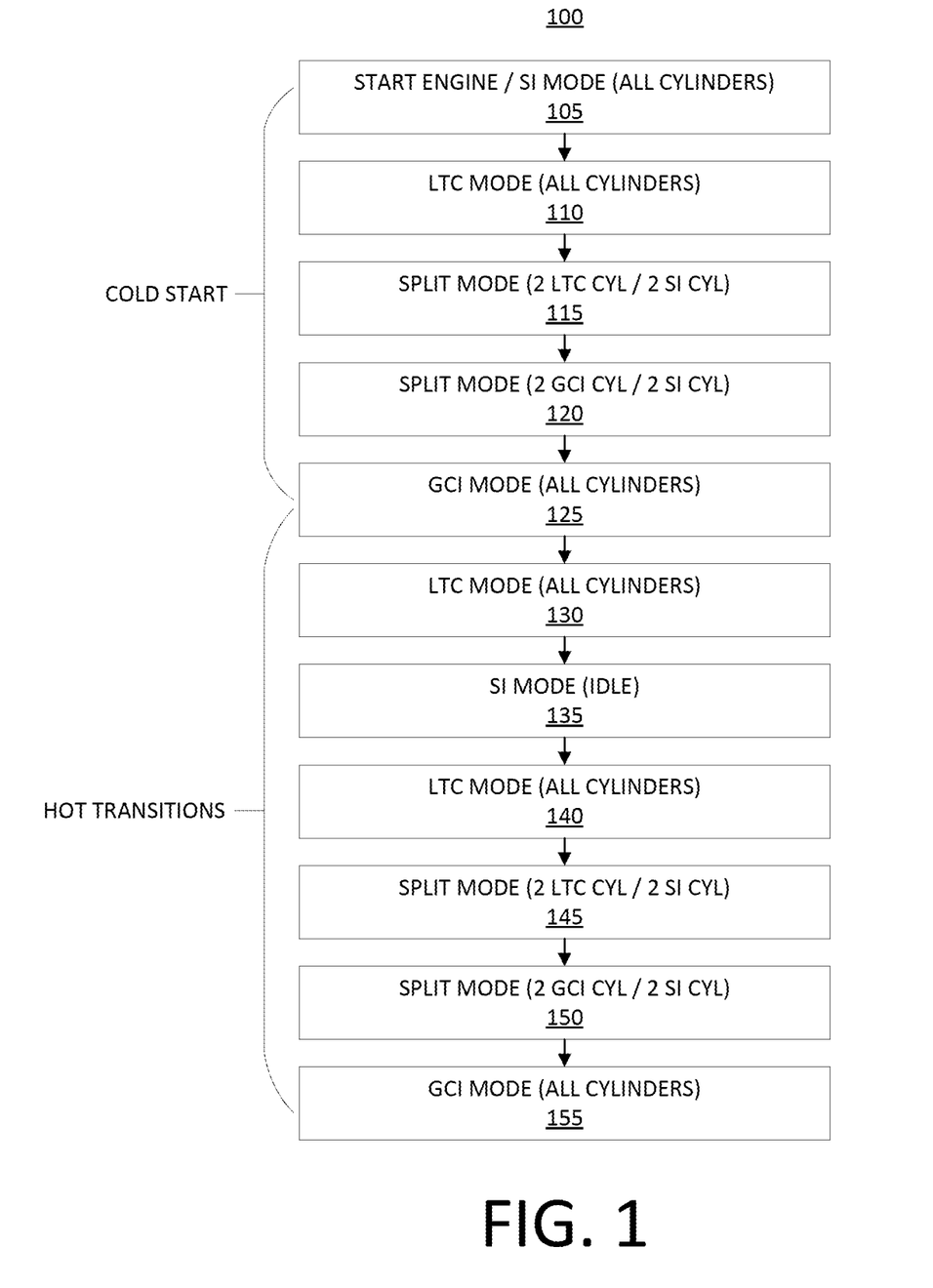
FIG. 1 illustrates a method for transitioning an engine from a Low temperature Combustion (LTC) mode to a Gasoline Compression Ignition (GCI) mode by utilizing split cycles in different pairs of cylinders, according to an exemplary embodiment of the present disclosure.

Referring now to FIG. 1, a method 100 for transitioning an engine from a Low temperature Combustion (LTC) mode to a Gasoline Compression Ignition (GCI) mode by utilizing split cycles in different pairs of cylinders is illustratively depicted, in accordance with an exemplary embodiment of the present disclosure.

According to an exemplary embodiment, the method 100 may be configured to smoothly transition from a LTC mode to a GCI mode by utilizing split cycles in different pairs of cylinders on a common engine. Exhaust energy may be increased, which provides additional boost to the engine, which allows initiation of the GCI mode in 2 cylinders which then supplies additional exhaust energy and additional boost to complete the remaining two cylinders' transition to the GCI mode.

According to an exemplary embodiment, engine operation may be split into pairs of cylinders, assuming a 4 cylinder, 4 cycle engine. It is noted, however, that engines having other numbers of cylinders and/or cycles may be incorporated while maintaining the spirit and functionality of the present disclosure.

During a cold start, the engine, at 105, is started, with all cylinders running in Spark ignition (SI) mode. As speed/load operating point increases, the engine, at 110, transitions to a LTC mode. According to an exemplary embodiment, the SI mode is used for starting engine, and operates as in a conventional SI engine, with a stoichiometric air/fuel ratio and engine speed/torque control using a throttle to restrict airflow. According to an exemplary embodiment, the LTC mode uses no airflow control, with negative valve overlap using a camshaft continuously variable valve duration (CVVD) mechanism, and torque demand controlled by fuel.

According to an exemplary embodiment, during transition to the GCI mode, which is used for higher load (e.g., greater than about 4 bar brake mean effective pressure (BMEP)). Because of the very different airflow, valve opening and closing timings, and fueling requirements, the transition from the LTC mode to the GCI is challenging, especially the slow response of air flow. By splitting the CVVD mechanism into a 2-part system, a first pair of 2 cylinders may be configured to operate on the SI mode for a short time, and a second pair of 2 cylinders may be configured to transition to the GCI mode with the first pair of 2 cylinders following shortly thereafter.

During operation of the engine in the LTC mode, a pair of cylinders, at 115, may transition back to the SI mode for one or more cycles, running in a split mode, in order to build exhaust energy which can be then supplied to a turbocharger which may be configured to supply sufficient boost to alternating pairs of cylinders to allow transition from LTC to GCI mode in a split mode, at 120.

Generally, the transition from the LTC mode to the GCI mode may be problematic due to the GCI mode needing a high boost pressure from the turbocharger in order to achieve high enough cylinder pressures and temperatures to ignite combustion with stability. Since the LTC mode combustion is very low temperature, promoting good fuel economy and emissions, there is not much heat from the combustion reaching the turbocharger turbine in order to provide the boost needed for GCI combustion. This makes the transition from the LTC mode to the GCI mode very difficult since GCI combustion cannot occur until the boost is provided, and the boost cannot be provided until sufficient heat is provided via the GCI mode. According to an exemplary embodiment of the present disclosure, the CVVD system may be split in order to provide the ability to operate two cylinder pairs independently using different camshaft timing and overlap for each pair.

According to an exemplary embodiment, in order to provide a smooth transition, and in order to avoid misfires on the transition from the LTC mode to the GCI mode, two cylinders may be dropped to the SI mode, temporarily, which increases the heat of combustion, providing heat to the turbocharger, which provides additional boost, which is then provided to the other two cylinders, allowing for GCI combustion. Then the first two cylinders may be switched to the GCI mode directly over the SI mode. Since the transition from the LTC mode to the GCI mode occurs in stair-step rather than in one step, torque output from different operating conditions may be varied over a longer time period and is not noticeable to the user. An example of camshaft timing is shown in Table 1.

TABLE 1

| Combustion Mode | Camshaft Timing | Load Control | Spark Initiation |
| --- | --- | --- | --- |
| Spark Ignited | Positive Valve Overlap | Airflow | Spark Ignition (spark plug) |
| LTC Mode | Negative Valve Overlap | Fuel Injected | Hot Residuals |
| GCI Mode | Positive Valve Overlap | Fuel Injected | Compression Ignition |

According to an exemplary embodiment, the CVVD and CVVT system, implemented on the GCI engine, may be configured to provide the ability for mode change from SI mode to LTC mode and from LTC mode to GCI mode. The operation of cylinder pairs in the SI mode requires camshaft intake/exhaust valve overlap (straight timing, or positive valve overlap). During the transition from the SI mode to the LTC mode, the CVVD mechanism may be moved to a negative valve overlap, which traps in-cylinder residuals, which may be used as an initiator of combustion. During the transition from the LTC mode to the GCI mode, camshaft timing may be returned to positive valve overlap and in-cylinder temperatures may be controlled by fuel and boost. Due to the LTC mode and the GCI mode needing different camshaft timing, the CVVD system may be split to different pairs of cylinders in order to provide necessary camshaft timing for each pair of cylinders.

Once GCI combustion is established, sufficient exhaust energy is produced to support both cylinder pairs in GCI combustion, at 125. At this point, the GCI operating range may be open for full operation. According to an exemplary embodiment, during hot transitions, short times in the LTC mode, at 130, may be tolerated due to thermal heat soaking of the cylinder and the turbocharger. According to an exemplary embodiment, the LTC mode, for all cylinders, may be limited to retain quick transition back to the GCI mode. According to an exemplary embodiment, the engine may idle in SI mode, at 135, before returning to LTC mode, at 140. According to an exemplary embodiment, once in the LTC mode, at 140, the cylinders may shift in the split mode, at 145, with 2 cylinders in the LTC mode and 2 cylinders in the SI mode, and/or may shift in the split mode, at 150, with 2 cylinders in the GCI mode and 2 cylinders in the SI mode, before returning all cylinders to the GCI mode, at 155.

Because operation in LTC mode requires differing camshaft timing/cylinder filling from operation in GCI mode, operating each pair of cylinders in different modes requires different camshaft timings and overlap.

According to an exemplary embodiment, during, cold start, the engine is operated in the SI mode or in the LTC mode only, due to insufficient engine temperatures. Once engine temperatures have stabilized, operation in GCI mode can occur due to an increase in available heat and boost pressure. During hot transitions, cylinder pairs may be operated in different modes by simply moving camshaft timing for that pair to the appropriate timing.

According to an exemplary embodiment, operation of the CVVD mechanism may be split into pairs of cylinders, front and rear. By operating the CVVD mechanism with discrete settings for each pair, each pair of cylinders may be configured to operate independently to produce a desired cycle per pair of cylinders. For example, the engine may be configured to run in a split mode, at 140, in which one pair of cylinders is running in LTC mode and one pair of cylinders is running in SI mode. The engine may also be configured to run in a split mode, at 145, in which one pair of cylinders is running in GCI mode and one pair of cylinders is running in SI mode. The engine may, at 150, then return to all cylinders running in GCI mode.

Figure 2:
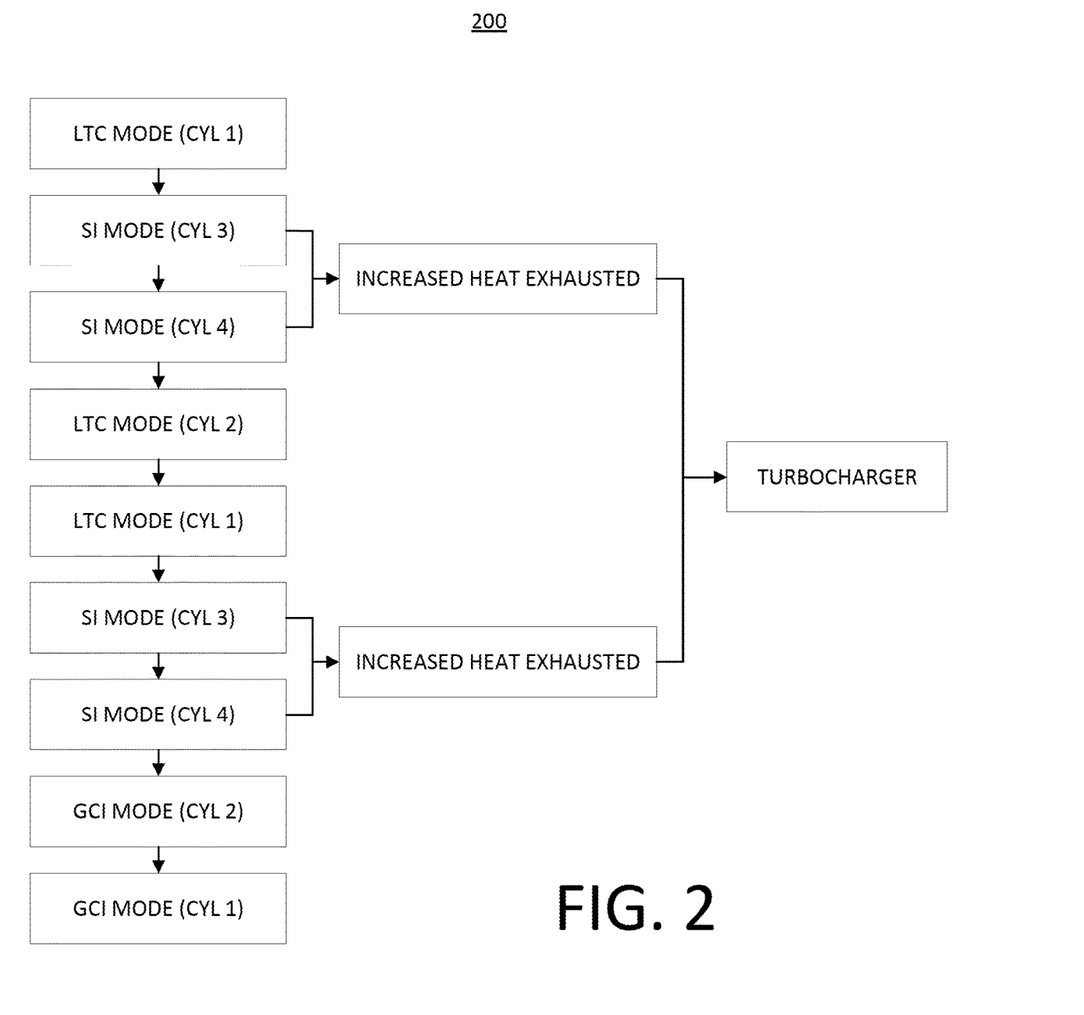
FIG. 2 illustrates a sequence of operation in a split mode, according to an exemplary embodiment of the present disclosure.

Referring now to FIG. 2, a sequence 200 of operation in a split mode, is illustratively depicted, in accordance with an exemplary embodiment of the present disclosure.

According to an exemplary embodiment, firing order is maintained as per standard 1-3-4-2, wherein paired cylinders 1, 2 and 3, 4 are operated on different cycle modes simultaneously over the same engine revolution. The firing order allows "slugs" of increased enthalpy as a result of the operation of one pair of cylinders in SI mode for a number of cycles, increasing turbocharger input enthalpy above the threshold required to make transition to GCI mode operation.

According to an exemplary embodiment, the cycle sequence may comprise, in the 1-3-4-2 standard sequence, running cylinder 1 in LTC mode, running cylinder 3 in SI mode, running cylinder 4 in SI mode, and running cylinder 2 in LTC mode, wherein the pair 3, 4 of cylinders running in the SI mode results in increased heat exhausted, increasing turbocharger input enthalpy above the threshold required to make transition to GCI mode operation. According to an exemplary embodiment, sequence is then followed by a subsequent 1-3-4-2 standard sequence in which cylinder 1 is run in LTC mode, cylinder 3 is run in SI mode, cylinder 4 is run in SI mode, and cylinder 2 is run in GCI mode, wherein the pair 3, 4 of cylinders running in the SI mode results in increased heat exhausted, increasing turbocharger input enthalpy. According to an exemplary embodiment, cylinder 1 then runs in GCI mode.

According to an exemplary embodiment, a methods and systems of the present disclosure may enable different combustion mode operations for different pairs of cylinders at steady state conditions. This may be configured to extend the operating range and benefits of low temperature combustion.

Figure 3:
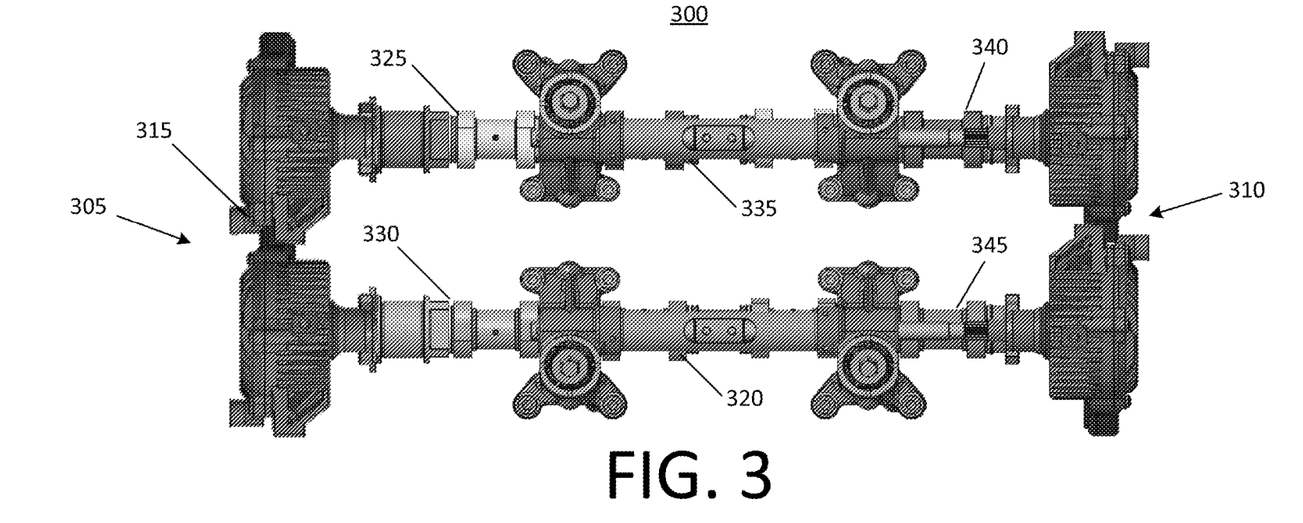
FIG. 3 illustrates a front view of a camshaft continuously variable valve duration (CVVD) mechanism, according to an exemplary embodiment of the present disclosure.
Figure 4:
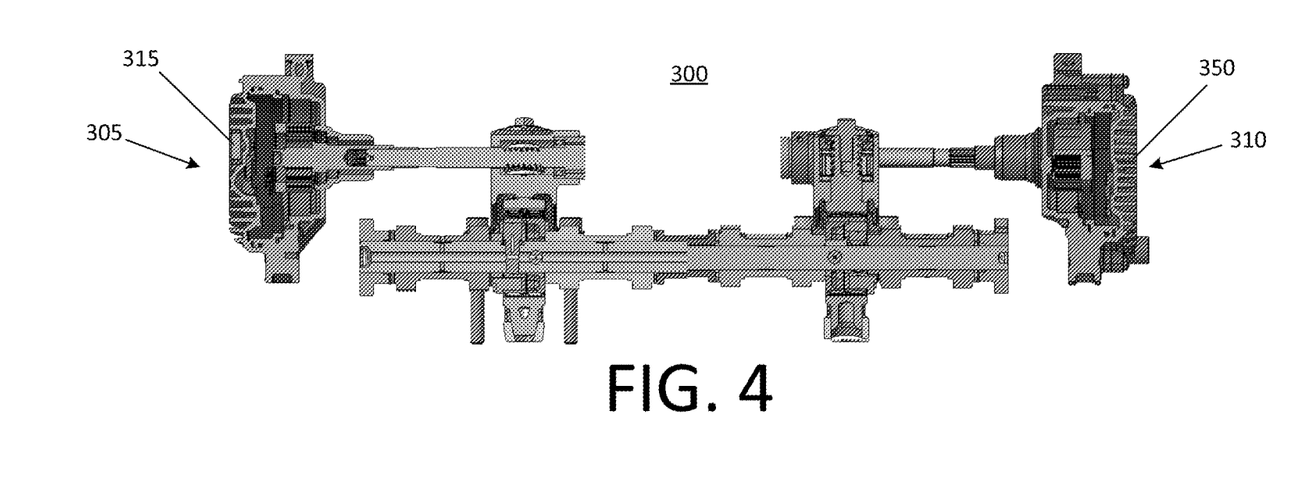
FIG. 4 illustrates a top view of a CVVD mechanism, according to an exemplary embodiment of the present disclosure.

Referring now to FIGS. 3-4, a top view (FIG. 3) and a side view (FIG. 4) of a CVVD mechanism 300 are illustratively depicted, in accordance with exemplary embodiments of the present disclosure.

According to an exemplary embodiment, the CVVD mechanism 300 is configured to provide varying durations of valve open time.

Continuously variable camshaft duration has been achieved by disconnecting a camshaft lobe from a main shaft rotation speed using a 4-bar mechanism. Lobe speed is variable depending on position of camshaft drive in relation to CVVD adjustment mechanism.

According to an exemplary embodiment, the CVVD 300 of the present disclosure is split into a front motor 305 and a rear motor 310, with an actuator 350 and an additional CVVD actuator 315 for an additional cylinder pair.

According to an exemplary embodiment, the front CVVD motor 305 may be configured to move the control shaft 320 of the CCVD mechanism 300 in order to provide CVVD for cylinder 1 (325) and cylinder 2 (330). According to an exemplary embodiment, the rear CVVD motor 310 may be configured to move a control shaft 335 of the CVVD mechanism 300 in order to provide CVVD for cylinder 3 (340) and cylinder 4 (345). In this way, the camshaft duration of the front cylinder pair (325, 330) and rear cylinder pair (340, 345) may be varied independently.

According to an exemplary embodiment, a desired/functional camshaft duration of the LTC mode may be different from a desired/functional duration of the GCI mode or the SI mode. In the LTC mode, the desired operation point may be, e.g., ~140° crank angle negative overlap with 160 crank angle degrees duration. In the GCI mode, the desired operation point may be, e.g., ~30 deg crank angle negative overlap with 200° crank angle duration. It is noted, however, that the desired operation point and/or the degree crank angle duration for one or more of the engine operation modes may be different, while maintaining the spirit and functionality of the present disclosure.

According to an exemplary embodiment, the split CVVD mechanism 300 comprises the additional CVVD actuator 315 in order to control the rear cylinder set (340, 345). According to an exemplary embodiment, the camshaft may be configured to be split and driven from an opposite end using another camshaft.

As shown in FIG. 3, a first CVVD actuator 315 may be configured to control cylinder intake from the front cylinder pair (325, 330) and control the respective exhaust control shaft, and the second actuator 115 may be configured to control cylinder intake from the rear cylinder pair (340, 345) and control the respective exhaust control shaft. According to an exemplary embodiment, the camshaft core may be configured to be driven from one end, and the CVVD mechanism 300 may be configured to be driven through the camshaft core.

According to an exemplary embodiment, one camshaft may be split into two half camshafts, and a rear half camshaft may be configured to be driven from the rear end of the camshaft by a chain connection. According to an exemplary embodiment, a camshaft phaser may be added to provide full duration and timing control for the intake camshaft halves, separately.

According to an exemplary embodiment, the camshaft core may be driven in complete form on one camshaft, drive power may be passed to a rear sprocket to a timing chain and sprocket to second camshaft core rear half. According to an exemplary embodiment, the front half may continue to be driven by original timing chain at the front of the engine/timing drive.

Figure 5:
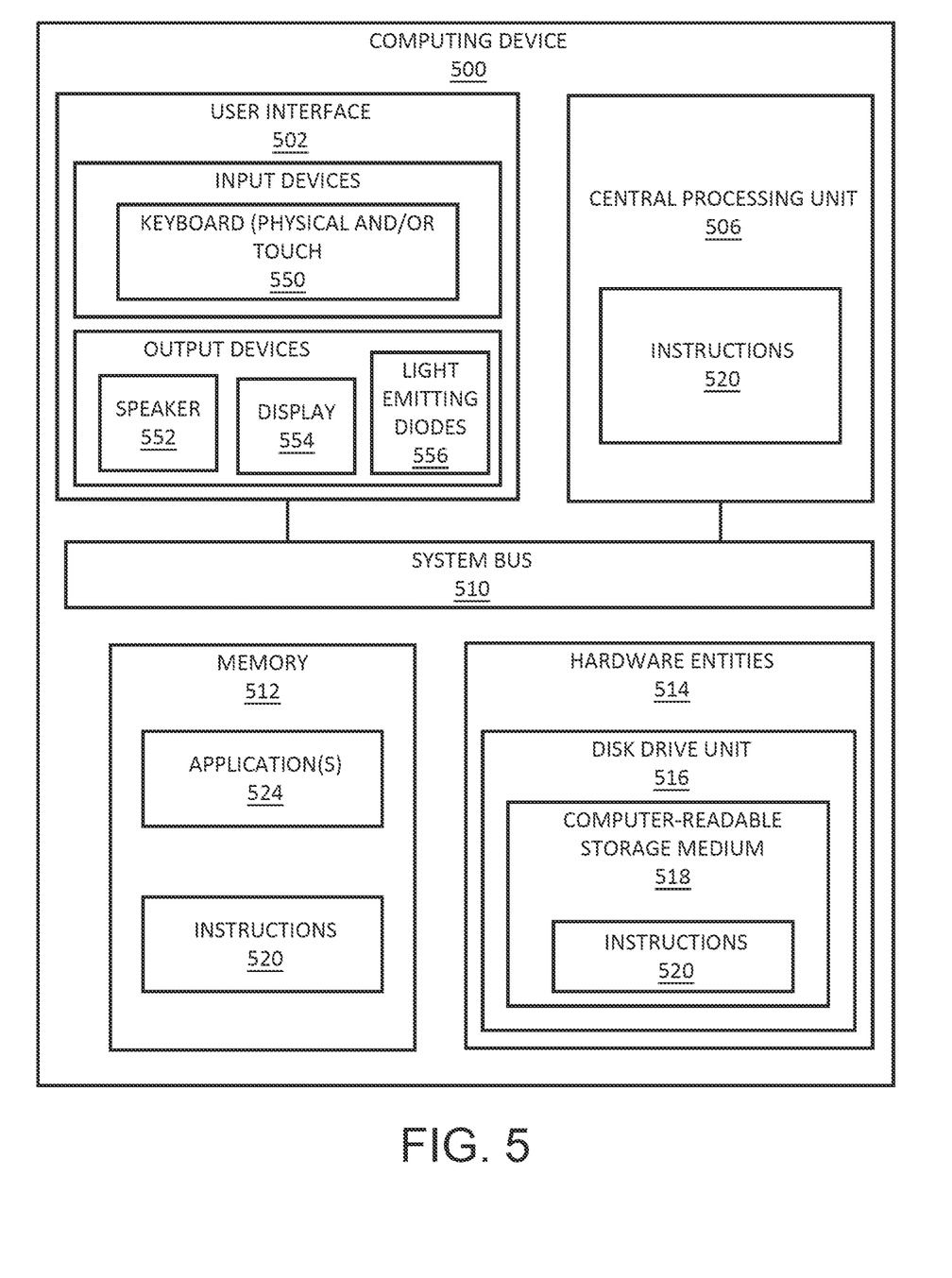
FIG. 5 illustrates example elements of a computing device, according to an exemplary embodiment of the present disclosure.

Referring now to FIG. 5, an illustration of an example architecture for a computing device 500 is provided. According to an exemplary embodiment, one or more functions of the systems (e.g., system 300) of the present disclosure may be implemented by a computing device such as, e.g., computing device 500 or a computing device similar to computing device 500.

Computing device 500 may comprise more or less components than those shown in FIGS. 3-4. The hardware architecture of FIG. 5 represents one example implementation of a representative computing device configured to one or more methods and means for transitioning an engine from a LTC mode to a GCI mode by utilizing split cycles in different pairs of cylinders, as described herein. As such, the computing device 500 of FIG. 5 implements at least a portion of the method(s) (e.g., method 100, sequence 200, etc.) described herein.

Some or all components of the computing device 500 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 5, the computing device 500 may comprise a user interface 502, a Central Processing Unit ("CPU") 506, a system bus 510, a memory 512 connected to and accessible by other portions of computing device 500 through system bus 510, and hardware entities 514 connected to system bus 510. The user interface may comprise input devices and output devices, which may be configured to facilitate user-software interactions for controlling operations of the computing device 500. The input devices may comprise, but are not limited to, a physical and/or touch keyboard 550. The input devices may be connected to the computing device 500 via a wired or wireless connection (e.g., a Bluetooth® connection). The output devices may comprise, but are not limited to, a speaker 552, a display 554, and/or light emitting diodes 556.

At least some of the hardware entities 514 may be configured to perform actions involving access to and use of memory 512, which may be a Random Access Memory (RAM), a disk driver and/or a Compact Disc Read Only Memory (CD-ROM), among other suitable memory types. Hardware entities 514 may comprise a disk drive unit 516 comprising a computer-readable storage medium 518 on which may be stored one or more sets of instructions 520 (e.g., programming instructions such as, but not limited to, software code) configured to implement one or more of the methodologies, procedures, or functions described herein. The instructions 520 may also reside, completely or at least partially, within the memory 512 and/or within the CPU 506 during execution thereof by the computing device 500.

The memory 512 and the CPU 506 may also constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution by the computing device 500 and that cause the computing device 500 to perform any one or more of the methodologies of the present disclosure.

The above description is merely illustrative of the technical spirit of the present disclosure, and those skilled in the art to which the present disclosure belongs may make various modifications and changes without departing from the essential features of the present disclosure.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A method for transitioning an engine from a Low temperature Combustion (LTC) mode to a Gasoline Compression Ignition (GCI) mode, comprising:
    performing a cold start on an engine, wherein:
        the engine comprises at least two sets of cylinders, wherein each set of cylinders comprises a two-cylinder pair of cylinders, and
        each pair of cylinders is capable of differing camshaft operating points, consisting of identical cam lob shapes with discrete control mechanisms consisting of a CVVD mechanism on each discrete pair of cylinders, and a discrete CVVT system on each discrete pair of cylinders,
    performing the cold start comprises running all of the at least two sets of cylinders in a Spark Ignition (SI) mode; and
    using a discrete camshaft operation for a different pair of combustion cylinders to run all of the at least two sets of cylinders in a LTC mode:
        when a load operation point of the engine increases:
            transitioning a first set of cylinders, of the at least two sets of cylinders, to run in a SI mode; and
            after the first set of cylinders is transitioned to run in the SI mode, transitioning a second set of cylinders, of the at least two sets of cylinders, to run in the GCI mode; and
        after the second set of cylinders are transitioned to run in the GCI mode:
            transitioning the first set of cylinders to run in a GCI mode.

2. The method of claim 1, wherein running in the LTC mode comprises:
    running with a negative valve overlap using a discrete camshaft operation for a different pair of combustion cylinders,
    wherein, the exhaust valve closing timing is earlier than the intake valve opening timing.

3. The method of claim 1, wherein transitioning the first set of cylinders to run in the GCI mode is performed when the load operation point increases to approximately 4 bar brake mean effective pressure (BMEP).

4. The method of claim 1, further comprising, when the at least two sets of cylinders are transitioned to run in the LTC mode:
    transitioning the first set of cylinders or the second set of cylinders to run in the SI mode for one or more cycles in order to build exhaust energy for turbocharger to have higher boost for transitioning the at least two sets of cylinders to run in the GCI mode.

5. The method of claim 1, further comprising, when the at least two sets of cylinders are transitioned to run in the LTC mode:
    transitioning all of the at least two sets of cylinders to run in the SI mode for one or more cycles in order to build exhaust energy for turbocharger to have higher boost for transitioning the at least two sets of cylinders to run in the GCI mode.

6. The method of claim 1, wherein the first set of cylinders and the second set of cylinders are configured to be controlled independently from each other.

7. A system for transitioning an engine from a Low temperature Combustion (LTC) mode to a Gasoline Compression Ignition (GCI) mode, comprising:
    an engine comprising at least two sets of cylinders, wherein each set of cylinders comprises a two-cylinder pair of cylinders
    wherein the engine is configured to perform a cold start on an engine, comprising running all of the at least two sets of cylinders in a Spark Ignition (SI) mode; and
    a discrete camshaft for a different pair of combustion cylinders configured to run all of the at least two sets of cylinders in a LTC mode:
        when a load operation point of the engine increases:
            transition a first set of cylinders, of the at least two sets of cylinders, to run in a SI mode; and
            after the first set of cylinders is transitioned to run in the SI mode, transition a second set of cylinders, of the at least two sets of cylinders, to run in the GCI mode; and
        after the second set of cylinders is transitioned to run in the GCI mode:
            transition the first set of cylinders to run in a GCI mode.

8. The system of claim 7, wherein running in the LTC mode comprises:
    running with no airflow control; and
    running with a negative valve overlap using a discrete camshaft operation for a different pair of combustion cylinders,
    wherein, the exhaust valve closing timing is earlier than the intake valve opening timing.

9. The system of claim 7, wherein the discrete camshaft operation for a different pair of combustion cylinders is configured to transition the first set of cylinders to run in the GCI mode when the load operation point increases to approximately 4 bar brake mean effective pressure (BMEP).

10. The system of claim 7, wherein the discrete camshaft operation for a different pair of combustion cylinders is configured to, when the at least two sets of cylinders are transitioned to run in the LTC mode:
   transition the first set of cylinders or the second set of cylinders to run in the SI mode for one or more cycles in order to build exhaust energy for turbocharger to have higher boost for transitioning the at least two sets of cylinders to run in the GCI mode.

11. The system of claim 7, wherein the discrete camshaft operation for a different pair of combustion cylinders is configured to, when the at least two sets of cylinders are transitioned to run in the LTC mode:
   transition all of the at least two sets of cylinders to run in the SI mode for one or more cycles in order to build exhaust energy for turbocharger to have higher boost for transitioning the at least two sets of cylinders to run in the GCI mode.

12. The system of claim 7, wherein the first set of cylinders and the second set of cylinders are configured to be controlled independently from each other.

\* \* \* \* \*